United States Patent
Kuhn et al.

(12) 
(10) Patent No.: US 6,239,964 B1
(45) Date of Patent: May 29, 2001

(54) METHOD OF MAKING A VEHICLE WINDSHIELD SURFACE HYDROPHILIC

(75) Inventors: Ulrich Kuhn, Renningen; Werner Metzger-Goronzy, Leonberg; Wolfgang Leutsch, Buehlertal; Hans Braun, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/331,523

(22) PCT Filed: Oct. 9, 1998

(86) PCT No.: PCT/DE98/02984

§ 371 Date: Jun. 22, 1999

§ 102(e) Date: Jun. 22, 1999

(87) PCT Pub. No.: WO99/22429

PCT Pub. Date: May 6, 1999

(30) Foreign Application Priority Data

Oct. 24, 1997 (DE) ............................ 197 46 989

(51) Int. Cl.[7] .................................. H01T 19/00
(52) U.S. Cl. .................. 361/225; 307/10.1; 361/229
(58) Field of Search .................. 307/10.1; 361/225, 361/339, 230, 231; 430/937

(56) References Cited

U.S. PATENT DOCUMENTS

| | | | |
|---|---|---|---|
| 4,169,280 | * 9/1979 | Lord et al. ........................ | 361/225 |
| 4,246,624 | * 1/1981 | Lazelle ............................. | 361/218 |
| 4,999,733 | * 3/1991 | Kakuda ............................ | 361/213 |
| 5,378,521 | * 1/1995 | Ogawa et al. .................... | 428/85 |
| 5,466,424 | 11/1995 | Kusano . | |
| 5,580,605 | * 12/1996 | Ogawa et al. .................... | 427/155 |

FOREIGN PATENT DOCUMENTS

| | | |
|---|---|---|
| 0 462 526 | 12/1991 | (EP) . |
| 644227 | * 3/1995 | (EP) . |
| 1051880 | * 12/1966 | (GB) . |
| 1183815 | * 3/1970 | (GB) . |
| 1213291 | * 11/1970 | (GB) . |

OTHER PUBLICATIONS

Patent Abstracts Of Japan vol. 12, No. 387 (C–536) 3234, Nov. 14, 1988 & JP 63 134053 A, Jun. 6, 1988.

* cited by examiner

Primary Examiner—Fritz Fleming
(74) Attorney, Agent, or Firm—Michael J. Striker

(57) ABSTRACT

The method for making the surface of a window or windshield of a vehicle hydrophilic improves visibility for the operator of the vehicle during rain or fog. The method includes exposing the window or windshield surface to a corona discharge from at least one moving electrode that passes over the surface, especially at least one electrode associated with the rubber wiper blade (22) of a wiper apparatus for the window or windshield. The degree of hydrophilization of the surface is controlled by adjusting the level and/or the frequency or the duration of the high-frequency alternating current voltage applied to the moving electrode to produce the corona discharge. Alternatively the degree of hydrophilization of the surface is controlled by adjusting the spacing (a) of the at least one electrode from the surface.

11 Claims, 1 Drawing Sheet

METHOD OF MAKING A VEHICLE WINDSHIELD SURFACE HYDROPHILIC

BACKGROUND OF THE INVENTION

1. Field of the Invention

The invention relates to a method for making surfaces hydrophilic, in particular surfaces of motor vehicle windows.

2. Prior Art

It is known that moisture striking surfaces leads to the formation of fine water droplets in the form of spherical domes due to limits of tension. Particularly on windows of motor vehicles, this impairs visibility for a vehicle driver. The droplets collecting on the surface of the vehicle window act as short focal length converging lenses, which results in a sharp increase in the percentage of scattered light, with an attendant considerable impairment to visibility. In order to eliminate the disadvantages connected with this, it is known to make the surface of motor vehicle windows hydrophilic. This should achieve the fact that the contact angle of water on this surface becomes very small and approaches zero in the borderline case of film-like wetting so that only a correspondingly very slight change in the refraction angle occurs. Usually, chemical additives are added to the wiper fluid, which should assure that windows are made hydrophilic. In addition to the undesirable side effects due to the chemical additives, this can only achieve a very incomplete, i.e. only temporarily effective result.

SUMMARY OF THE INVENTION

It is an object of the present invention to provide a method of making a vehicle window, windscreen or windshield hydrophilic, so that visibility is improved during rain and similar weather conditions without using any additional chemical means.

According to the present invention the method of making the windshield, windscreen or window of the vehicle hydrophilic comprises exposing the surface of the window, windscreen or windshield to a corona discharge from at least one moving electrode that passes over the surface, especially to a corona discharge from a moving electrode connected or associated with a wiper blade of a wiper apparatus for the window, windscreen or windshield.

The method according to the invention offers the advantage over the prior art that a relatively long-lasting hydrophilization of surfaces is possible in a simple manner. By virtue of the fact that the surface is subjected to a corona discharge, an influence on the molecular structure can be produced on the surface of windows, which leads to a reduction of limits of tension between the surface and moisture striking the surface so that a much more extensive spreading of moisture droplets on the surface is possible. As a result of the much smaller contact angle connected with this, a thin film forms on the surface that has been hydrophilized by means of the corona discharge, the surface of which film extends essentially parallel to the surface of the window so that particularly when used on motor vehicle windows, there is no change in the refraction angle of transmitted light. This reduces an impairment to the vehicle driver's ability to see things.

In a preferred embodiment of the invention, the provision is made that the treatment of motor vehicle windows with a corona discharge takes place by means of a window wiper apparatus in motor vehicles, particularly by way of a window wiper rubber that functions as an electrode. As a result, it is advantageously possible to either continuously repeat the hydrophilization of the window surface with each starting of the window wiper apparatus or to repeat it at predetermined intervals within which experience has shown the hydrophilization of the surface to diminish.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
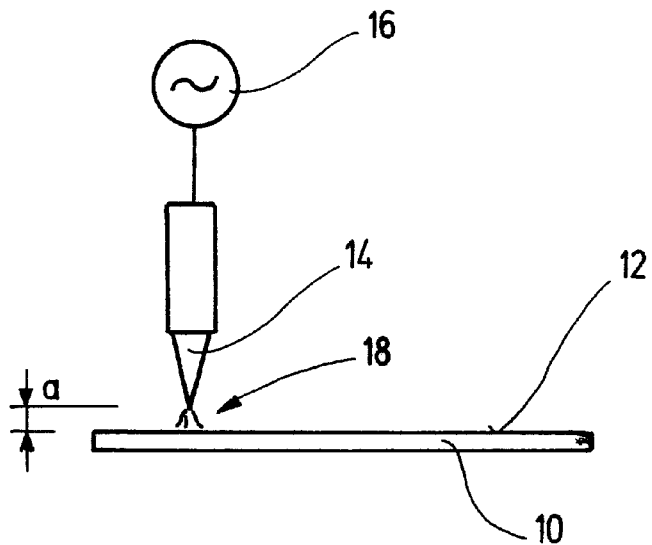
FIG. 1 is a diagrammatic plan view showing a corona treatment of a surface to make it hydrophilic according to the method of the invention.

FIG. 1 shows an object 10 whose surface 12 is intended to be hydrophilized. To this end, an electrode 14 is guided over the surface 12 at a distance a. The electrode 14 can, for example, be embodied as punctiform, linear, or planiform. The electrode 14 is connected to an a.c. voltage source 16 that supplies a high-frequency a.c. voltage. For example, the level of the a.c. voltage is 10 kV, with a frequency of 300 KHz. The application of the a.c. voltage to the electrode 14 leads to corona discharges 18, which are only indicated here. These corona discharges 18 result from an increase in the field intensity in the electrode 14 so that electrons and ions produced in this region are accelerated by a considerable energy gain. In this connection, when they collide with gas molecules, these produce a multitude of different ions which are likewise accelerated. This results in a cumulative increase in charge carriers and consequently to the corona discharge 18 that leads to a high voltage breakdown. This event repeats continuously so that by means of the corona discharge 18, the surface 12 can be treated with the accelerated charge carriers. According to the size of the surface 12 and/or the form of the electrode 14, the surface treatment can be carried out by means of an x-y rastering of the surface 12 by the electrode 14. With linear electrodes 14, a movement merely in the x direction can occur, while for example with planiform electrodes, a single application against the surface 12 is sufficient.

The intensity of the surface treatment can be varied on the one hand by means of varying the distance a, by means of the duration of the treatment per unit area, or by means of the level of the a.c. voltage of the a.c. voltage source 16.

Figure 2:
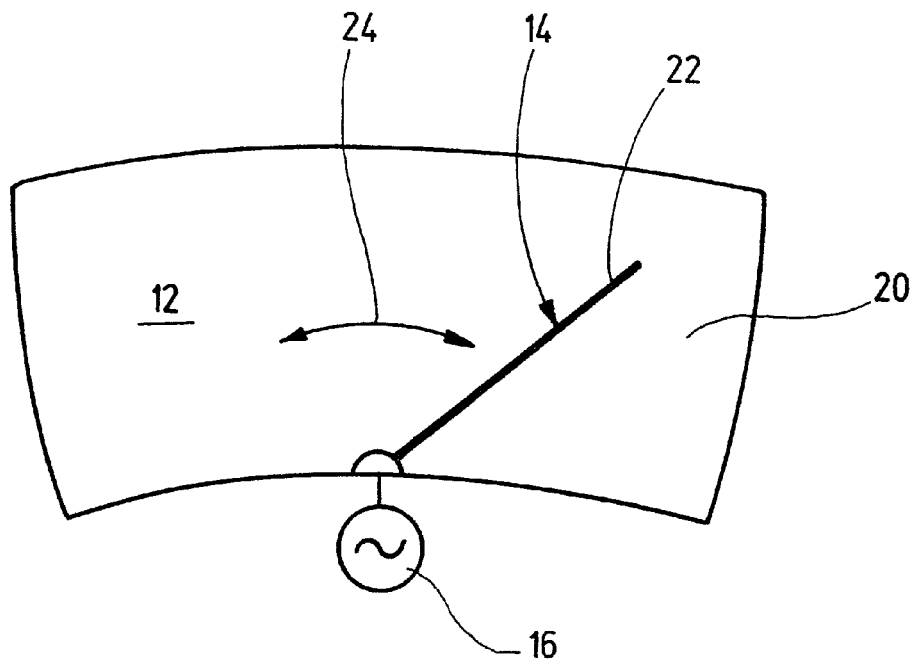
FIG. 2 is a diagrammatic plan view of an apparatus for performing the corona treatment according to the invention in order to make the surface of a windshield or windscreen hydrophilic.

In a purely schematic form, FIG. 2 shows a possible disposition on a windshield 20 of a motor vehicle that is not shown in detail. In this connection, the a.c. current source 16 can be combined in a suitable manner with a wiper blade 22 of a window wiper apparatus. When being used properly, the wiper blade 22 is moved back and forth over the windshield 20 in accordance with the double arrow 24 depicted. If the electrode 14 is now integrated into the wiper blade 22, or if the wiper blade 22 has the electrode 14, for example as a linear electrode or as point electrodes disposed spaced apart from one another along the wiper blade 22, then the hydrophilization of the surface of the windshield 20 can take place during the wiping movement. This makes it advantageously possible to carry out the hydrophilization of the windshield 20 by means of the corona discharge at any time, either during each wiping event of the wiper blade 22 or at fixed intervals.

Trials have shown that by hydrophilizing surfaces 12, in particular surfaces 12 of windshields 20, an extraordinarily high degree of hydrophilization can be achieved. A subsequent application of test droplets has led to an almost complete spreading of the droplets so that a film forms on the surface 12.

It has unexpectedly turned out that by means of the corona treatment 18 of the surfaces 12, particular recombination reactions take place on the surfaces 12, which lead to an alignment of the molecular structure. This encourages the hydrophilization of the surface 12 tremendously, as explained above.

The invention is naturally not limited only to the exemplary embodiment. For example, an external device can also be used for the corona treatment of the windshield. This could, for example, be a component of stationary washing installations or the like. It is also conceivable to equip filling stations, repair shops, etc. with devices for hydrophilizing vehicle windows by means of corona discharging.

What is claimed is:

1. A method of making a surface of a windshield or windscreen of a vehicle hydrophilic, said method including the steps of:

a) providing at least one electrode (14) arranged so that said at least one electrode (14) is movable over the surface of the windshield or the windscreen;

b) generating a corona discharge (18) at said at least one electrode (14); and c) moving said at least one electrode (14) over said surface (12) of said windshield or said windscreen during said generating of the corona discharge (18) in step b), so as to expose said surface to said corona discharge (18) from said at least one electrode (14) as said at least one electrode passes over said surface.

2. The method as defined in claim 1, further comprising controlling a duration of said generating and said moving in order to provide said surface with a predetermined degree of hydrophilization.

3. The method as defined in claim 1, further comprising controlling a spacing (a) of said at least one electrode (14) from said surface (12) in order to provide said surface with a predetermined degree of hydrophilization.

4. The method as defined in claim 1, wherein said generating of said corona discharge (18) takes place by applying an alternating current voltage having a predetermined level and frequency to said at least one electrode (14) and further comprising controlling at least one of said predetermined level and said frequency in order to provide said surface (12) with a predetermined degree of hydrophilization.

5. A method of making a surface of a window of a vehicle hydrophilic, said method including the steps of generating a corona discharge (18) at at least one moving electrode (14) passing over said surface (12) of said window and exposing said surface of said window to said corona discharge (18) from said at least one moving electrode.

6. A method of making a surface of a window of a vehicle hydrophilic, said method including the steps of:

a) providing a window wiper apparatus for said window, said window wiper apparatus including at least one rubber wiper blade (22) and means for moving said at least one rubber wiper blade (22) over the surface (12) of the window;

b) providing the at least one rubber wiper blade with at least one electrode (14) for producing a corona discharge (18);

c) applying a high-frequency alternating current voltage to said at least one electrode (14) to produce the corona discharge (18); and d) operating the window wiper apparatus to move the at least one rubber wiper blade over the surface (12) of the window together with the at least one electrode (14) while performing the applying of step c), in order to expose the surface of the window to the corona discharge and thus to make the surface of the window hydrophilic.

7. The method as defined in claim 6, wherein said window is a windshield or a windscreen of said vehicle.

8. The method as defined in claim 6, further comprising controlling a duration of said applying of said alternating current voltage in order to provide said surface (12) of said window with a predetermined degree of hydrophilization.

9. The method as defined in claim 6, further comprising controlling a spacing (a) of said at least one electrode (14) from said surface of said window during the applying, in order to provide said surface of said window with a predetermined degree of hydrophilization.

10. The method as defined in claim 6, wherein said alternating current voltage has a predetermined level and frequency and further comprising controlling at least one of said predetermined level and said frequency in order to provide said surface of said window with a predetermined degree of hydrophilization.

11. The method as defined in claim 6, wherein said at least one electrode (14) is part of an external apparatus that is not part of the vehicle and further comprising conducting the vehicle to the external apparatus so that said at least one electrode may be moved over said surface (12).

* * * * *